United States Patent
Chainer et al.

(10) Patent No.: US 6,839,195 B2
(45) Date of Patent: Jan. 4, 2005

(54) METHOD AND APPARATUS FOR ENHANCED PHASE ALIGNMENT FOR DIRECT ACCESS STORAGE DEVICE (DASD)

(75) Inventors: Timothy Joseph Chainer, Putnam Valley, NY (US); Jonathan Darrel Coker, Rochester, MN (US); David Timothy Flynn, Mantorville, MN (US); Mark Delorman Schultz, Ossining, NY (US)

(73) Assignee: Hitachi Global Storage Technologies Netherlands, B.V., Amsterdam (NL)

( * ) Notice: Subject to any disclaimer, the term of this patent is extended or adjusted under 35 U.S.C. 154(b) by 273 days.

(21) Appl. No.: 10/185,550

(22) Filed: Jun. 27, 2002

(65) Prior Publication Data

US 2004/0003193 A1 Jan. 1, 2004

(51) Int. Cl.$^7$ ................................................ G11B 5/09
(52) U.S. Cl. ........................................................ 360/51
(58) Field of Search ............................. 360/51, 31, 75, 360/68, 46

(56) References Cited

U.S. PATENT DOCUMENTS

| | | | | |
|---|---|---|---|---|
| 5,598,364 A | * | 1/1997 | McCall et al. ................. | 365/73 |
| 6,337,778 B1 | * | 1/2002 | Gagne ........................... | 360/51 |
| 2004/0012874 A1 | * | 1/2004 | Chainer et al. ................. | 360/51 |

* cited by examiner

*Primary Examiner*—Alan T. Faber
(74) *Attorney, Agent, or Firm*—Joan Pennington

(57) ABSTRACT

A method and apparatus are provided for implementing improved phase alignment in a direct access storage device (DASD). A reference clock input is received for providing a system clock. Locking to a synchronization field of a readback signal is performed by adjusting the phase of the system clock. A timing mark is detected and then the adjusted phase of the system clock is held. Responsive to the detected timing mark, a reference delay of a predefined number and fraction of system clock periods is identified. At an end of the reference delay, a write circuit accepts data and generates write signals for a write operation. The phase of the system clock is adjusted corresponding to a predefined fractional delay and is used to run a programmable counter that counts the predefined number of system clock periods corresponding to the reference delay.

12 Claims, 9 Drawing Sheets

COMPARISON OF DELAY FOR MINIMUM PHASE SET DIFFERENCE

METHOD AND APPARATUS FOR ENHANCED PHASE ALIGNMENT FOR DIRECT ACCESS STORAGE DEVICE (DASD)

CO-PENDING RELATED APPLICATIONS

This application is related to U.S. Ser. No. 10/184,343, filed on even date herewith entitled "Improved Self-Servowriting Multislot Timing Pattern" (IBM YOR920000374US1).

FIELD OF THE INVENTION

The present invention relates to a method and apparatus for implementing improved phase alignment in a direct access storage device (DASD).

DESCRIPTION OF THE RELATED ART

Direct access storage devices (DASDs) often incorporating stacked, commonly rotated rigid magnetic disks are used for storage of data in magnetic form on the disk surfaces. Data is recorded in concentric, radially spaced data information tracks arrayed on the surfaces of the disks. Transducer heads driven in a path toward and away from the disk axis of rotation write data to the disks and read data from the disks. Typically servo information is provided on one or more disk surfaces for reading by the transducer heads for accurately and reliably positioning transducer heads on the disk surfaces to read and write data.

Servo information is used to identify the start of different information fields around the track circumference to read and write data. The accuracy and reliability of head position measurements is very important, since poor tolerance in these measurements will degrade the performance and storage capacity of the DASD. Detection of timing marks is hindered by signal noise and track-to-track timing phase alignment offsets.

In the absence of phase alignment issues, an increase in servowriter frequency would simultaneously improve format efficiency and signal processing performance. A fundamental limiting factor in servo format efficiency is the phase alignment system at the servowriter.

A need exists for an improved method and apparatus for implementing improved phase alignment in a direct access storage device (DASD).

SUMMARY OF THE INVENTION

A principal object of the present invention is to provide a method and apparatus for implementing improved phase alignment in a direct access storage device (DASD). Other important objects of the present invention are to provide such method and apparatus for implementing improved phase alignment substantially without negative effect and that overcome many of the disadvantages of prior art arrangements.

In brief, a method and apparatus are provided for implementing improved phase alignment in a direct access storage device (DASD). A reference clock input is received for providing a system clock. Locking to a synchronization field of a readback signal is performed by adjusting the phase of the system clock. A timing mark is detected and then the adjusted phase of the system clock is held. Responsive to the detected timing mark, a reference delay of a predefined number and fraction of system clock periods is identified. At an end of the reference delay, a write circuit accepts data and generates write signals for a write operation.

In accordance with features of the invention, the phase of the system clock is adjusted corresponding to a predefined fractional delay and runs a programmable counter that counts the predefined number of system clock periods corresponding to the reference delay. Modifying the system clock phase corresponding to the predefined fractional delay enables a higher granularity in delay than one clock period. Measurement of the time between detected consecutive timing marks is provided by a counter that starts counting system clock periods when a timing mark is detected and continues until a next timing mark is detected. The number of system clock periods since detecting a previous timing mark and the current adjusted phase of the system clock are stored.

BRIEF DESCRIPTION OF THE DRAWINGS

The present invention together with the above and other objects and advantages may best be understood from the following detailed description of the preferred embodiments of the invention illustrated in the drawings, wherein.

DETAILED DESCRIPTION OF THE PREFERRED EMBODIMENTS

Figure 1:
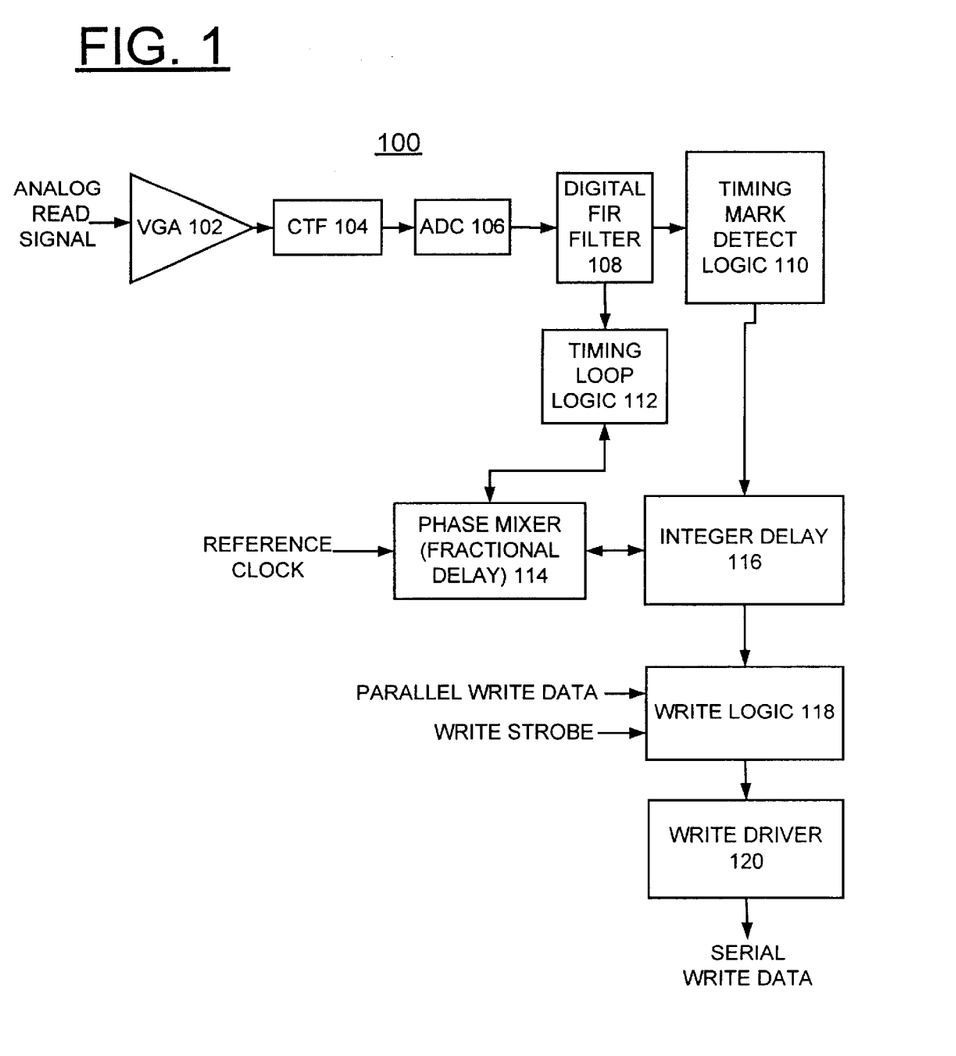
FIG. 1 is a block diagram representation illustrating a data channel including apparatus for implementing methods for improved phase alignment in data channels in accordance with the preferred embodiment.

Having reference now to the drawings, in FIG. 1, there is shown a data channel generally designated by the reference character 100 including apparatus for implementing methods for improved phase alignment of the preferred embodiment. As shown in FIG. 1, data channel 100 includes a variable gain amplifier (VGA) 102 receiving a differential read signal input. A continuous time filter (CTF) 104 receives the output of VGA 102 and provides a filtered input to an analog-to-digital converter (ADC) 106. ADC 106 converts the filtered read signal to a digital form. The digital read signal is equalized using a finite impulse response (FIR) filter 108 coupled to the output of ADC 106. The FIR filter 108 applies digital sample values to a timing mark detect logic 110 and a timing loop logic 112 of the preferred embodiment.

In accordance with features of the invention, data channel 100 includes a new clocking architecture including a precise reference clock. As shown in FIG. 1, the reference clock is applied to a phase mixer (fractional delay) function 114 of the preferred embodiment and the timing loop logic 112 that is coupled to the phase mixer fractional delay function 114. The phase mixer fractional delay function 114 and the timing mark detect logic 110 are coupled to an integer delay function 116 of the preferred embodiment. A write logic function 118 is coupled to the integer delay function 116. A write strobe and parallel write data are applied to inputs of the write logic function 118. The write logic function 118 applies an output write signal to a write driver 120.

In accordance with features of the invention, the new clocking architecture of data channel 100 accepts the reference clock input as a timing reference. Different phases of the reference clock are used internally in data channel 100 to achieve synchronization or sync up, read the timing mark, delay a fractional bit, count out a delay, and write data. Different phases of the reference clock are used to sync up with timing loop logic 112, read the timing mark with timing mark detect logic 110, delay a fractional bit with the phase mixer fractional delay function 114, count out a delay with integer delay function 116, and write data with write logic 118.

In accordance with features of the invention, data channel 100 fully supports multisync servo options with timing mark detection, variable delay, writing circuits, and time measurements. Additionally automark generation of the programmable delay values, or any component thereof, which are constrained in a given implementation and which can simplify or speed up processor intervention can be simply implemented. Another feature of the present invention is the ability to measure the time interval between timing marks. This may be used as velocity noise feedback, the sequence of which may determine subsequent delay values in the write operation. The timing mark detect logic 110 performs timing mark detection and time measurement by counting and storing a number of clocks since a previous timing mark detect, using one or more counters whose reference also begins at when a timing mark is detected. The counter continues its operation until another sync timing mark is achieved. The raw count value from mark to mark represents a coarse time value in clock units. Fractional clock accuracy is achieved by comparing the acquisition phase $\Phi_M$ and $\Phi_{M+1}$ of the two address or timing marks. A resulting time interval in clock units is defined by:

Time interval=raw count+$((\Phi_{M+1}-\Phi_M)$/phase units per clock unit)

Figure 2:
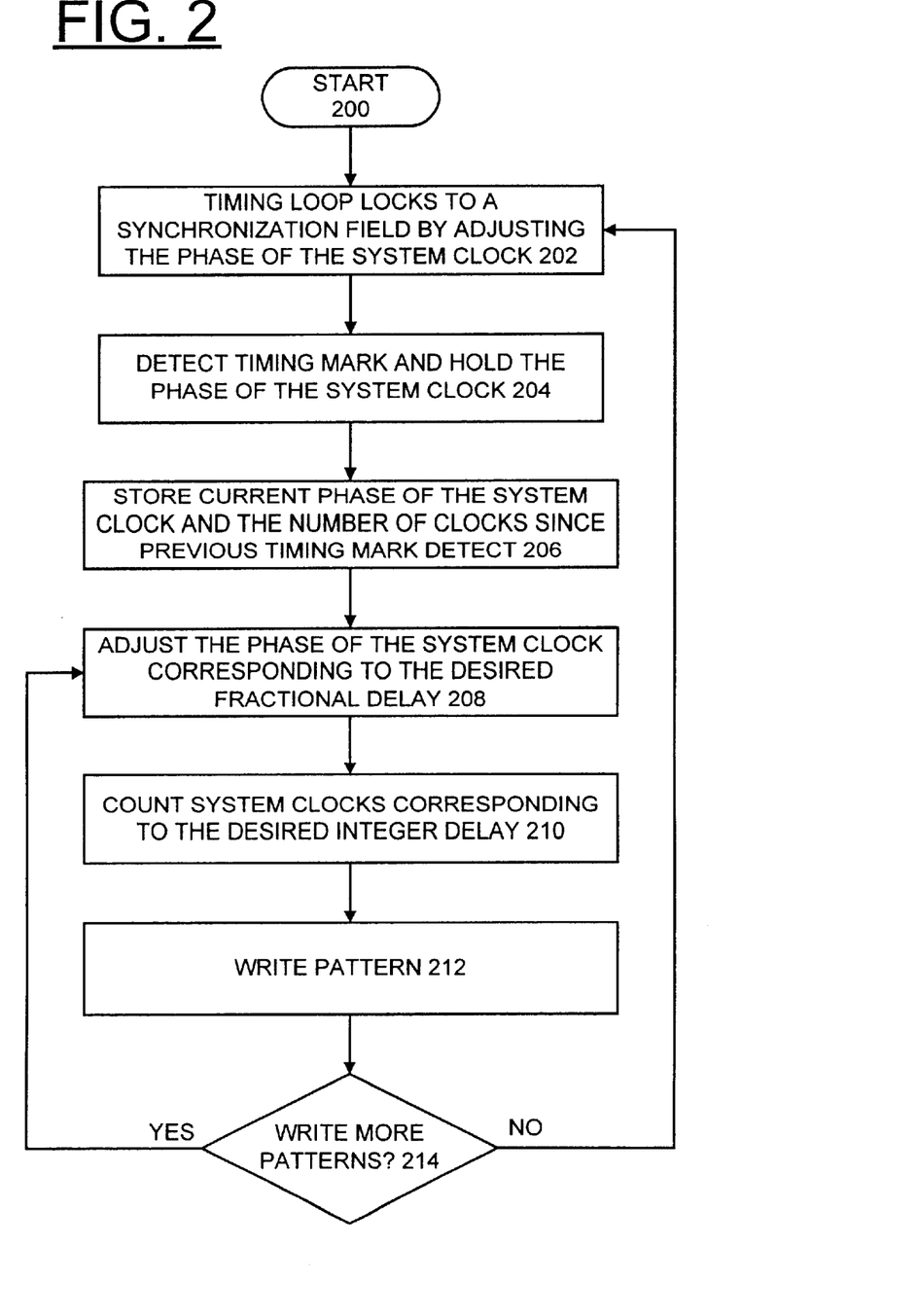
FIG. 2 is a flow chart illustrating exemplary functional logic functions for implementing improved phase alignment in data channels in accordance with the preferred embodiment.
Figure 3:
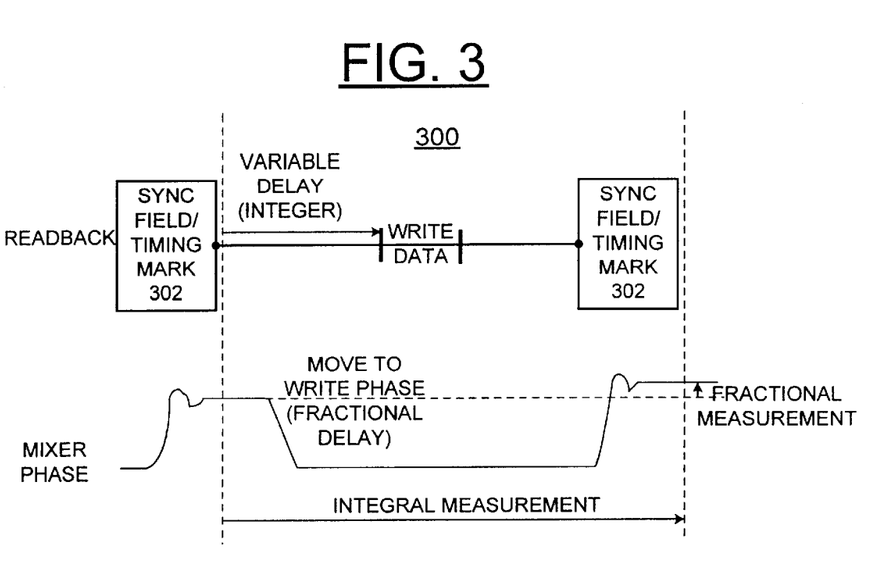
FIGS. 3 and 4 are graphs illustrating operation of the improved phase alignment apparatus of FIG. 1 in accordance with the preferred embodiment.
Figure 4:
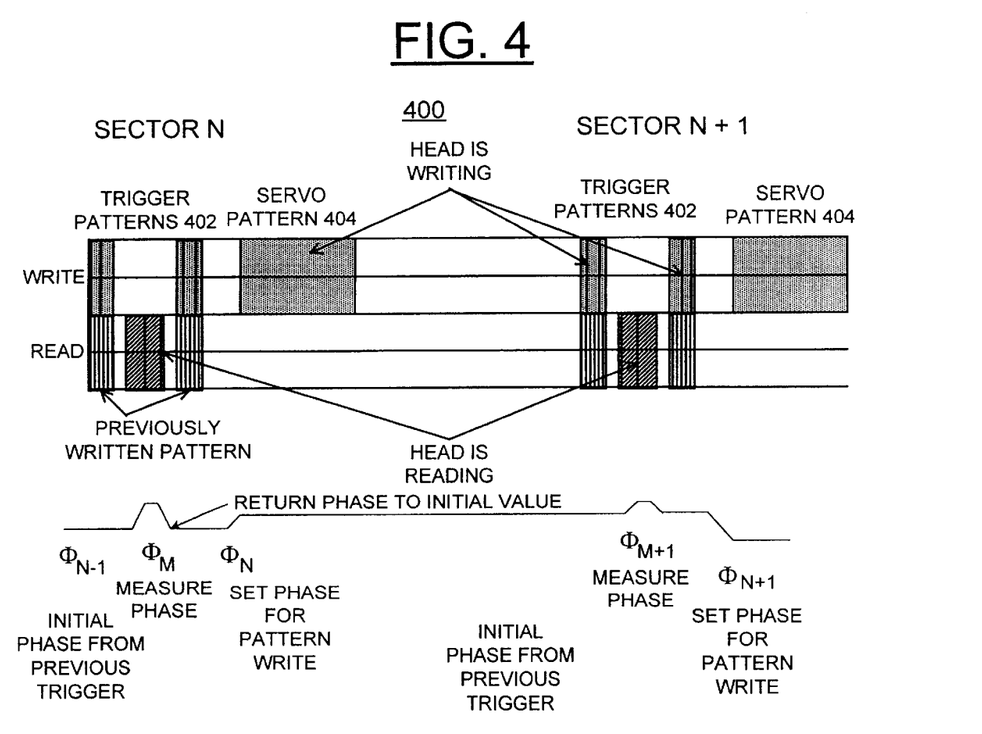

Having reference now to FIGS. 2, 3 and 4, improved phase alignment operation of the data channel 100 is illustrated. In FIG. 2 there are shown exemplary functional logic blocks for implementing improved phase alignment for servo detection and writing data in data channel 100 in accordance with the preferred embodiment starting at a block 200. The timing loop logic 112 locks to a synchronization field by adjusting the phase of the system clock as indicated in a block 202. Data channel 100 accepts the input reference clock, and the timing loop logic 112 controls the phase of the system clock using the phase mixer 114 at block 202.

In FIG. 3, the magnetic waveform shown at a line labeled READBACK includes a pattern designed to give timing information to data channel 100 known as the synchronization field. A pair of sync field/timing marks 302 are shown in the READBACK line. A line labeled MIXER PHASE represents the operation of timing loop logic 112. A wavy portion of the MIXER PHASE line under the sync field/timing mark 302 represents the timing loop logic 112 locking to the synchronization field 302 by adjusting the phase of the system clock. At a given signal of sync field/timing mark 302, the timing loop logic 112 aligns the phase of the reference clock to the magnetic waveform by standard control techniques.

After synchronization is achieved, timing mark detect logic 110 examines the waveform to determine an absolute timing mark. The timing mark is detected by the timing mark detect logic 110 and then the phase of the reference clock provided by the timing loop logic 112 is held constant as indicated in a block 204. The output of the phase mixer 114 provides an accurate timepiece as good as the input reference clock. Next, a delay reference begins when the timing mark is detected, and a programmable counter provides a delay of an integral number of clock periods. The current phase of the system clock and the number of clocks since the previous timing mart detect are stored by the timing mark detect logic 110 as indicated in a block 206.

A variable delay indicated in the READBACK line in FIG. 3 begins when the timing mark is detected, and a programmable counter provided by the integer delay function 116 provides a delay of an integral number of clock periods. To simply achieve a much higher granularity in delay than one clock unit, the system clock, that is the phase mixer output which is running the programmable counter of the integer delay function 116 is modified by a programmable fraction of a clock period with the phase mixer block 114.

The phase of the system clock is adjusted corresponding to the desired fractional delay as indicated in a block 208. The slew rate of the phase change must be limited so the clocked digital circuits continue to operate properly. By combining these methods, an accurate delay, programmable to fractional clock units, is achieved. System clocks corresponding to the desired integer delay are counted as indicated in a block 210. At the end of this delay, the write logic circuit 118 accepts data and generates write signals applied to the write driver 120 as indicated in a block 212.

Checking for more writes is performed as indicated in a decision block 214. When more writes are identified, then the phase of the system clock is adjusted corresponding to the desired fractional delay at block 208, the system clocks corresponding to the desired integer delay are counted at block 210, and a next write is performed at block 212. When no more writes are identified, then the operations return to block 202 where the timing loop logic 112 locks to a synchronization field by adjusting the phase of the system clock and continue.

It is to be understood by those well versed in the art, that any combination or repetition of these operations, such as multiple writes at multiple delay times after the timing mark, may be implemented and are covered by the present invention. One example variation known as write while read multislot is shown in FIG. 4.

Referring to FIG. 4, the graph illustrates the write while read multislot operation of the improved phase alignment apparatus of data channel 100 in accordance with the preferred embodiment. In the upper portion of FIG. 4, two sectors, sector N and sector N+1, are illustrated. A write operation is illustrated at the top of the upper portion and a read operation is illustrated at the bottom of the upper portion. Each of the sector N and sector N+1 includes a trigger pattern 402 and a servo pattern 404. Trigger and servo patterns 402 and 404 are shown as a shaded area and are indicated that the head is writing. Previously written patterns are indicated by vertical cross-hatched areas and patterns that the head is reading are indicated by slanted cross-hatched areas.

A corresponding phase operation of the improved phase alignment apparatus of data channel 100 is shown at a lower portion of FIG. 4. An initial phase from a previous trigger is indicated as $\Phi_{N-1}$, followed by a measure phase $\Phi_M$ of the first sector N, then the phase returns to the initial value. The phase is set for the servo pattern 404 write of the first sector N as indicated by phase $\Phi_N$. Then the phase $\Phi_N$ as the initial phase from previous trigger precedes a measure phase $\Phi_{M+1}$ of the next sector N+1. Then the phase is set for the servo pattern 404 write of the sector N+1 as indicated by phase $\Phi_{N+1}$.

Figure 5:
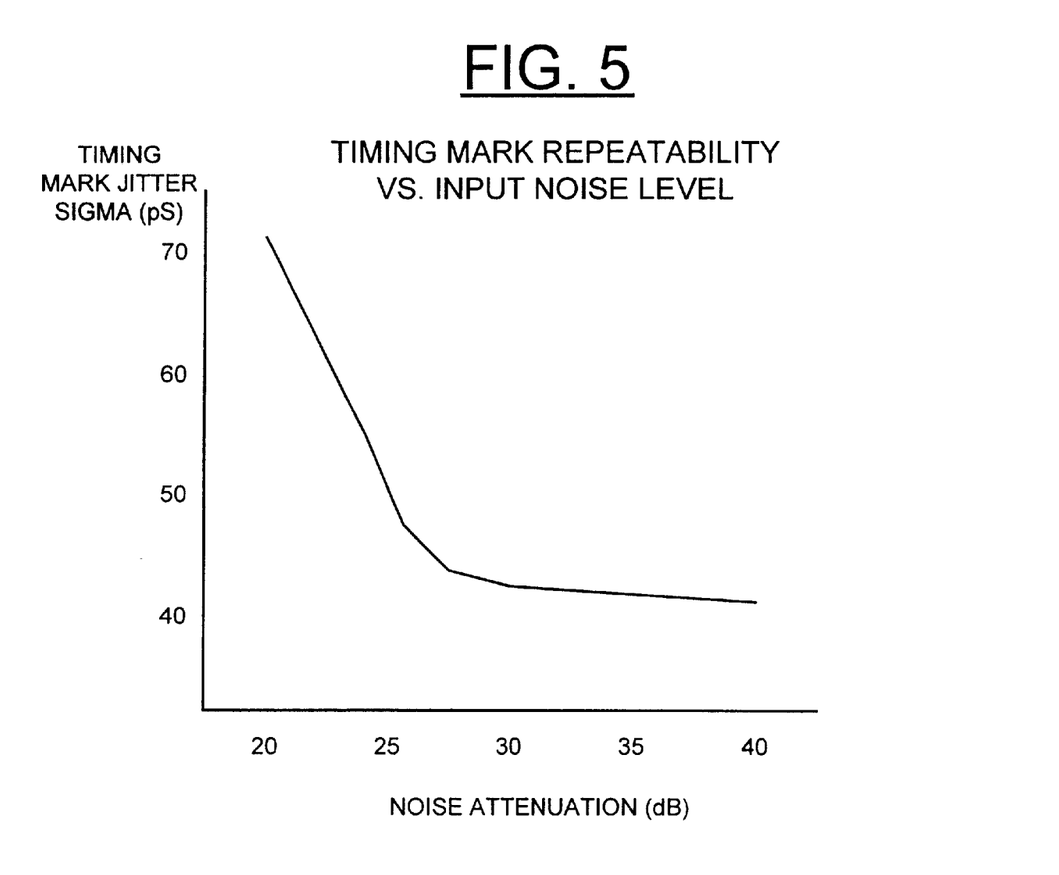
FIG. 5 is a graph illustrating timing mark repeatability versus input noise level in data channel of FIG. 1 in accordance with the preferred embodiment.

FIG. 5 illustrates timing mark repeatability versus input noise level in a data channel 100. At noise levels which support reasonable error rates, for example, about 25 dB or higher attenuation, the variation in timing mark accuracy is less than 50 pS 1 sigma, or so small as to be difficult to measure.

Figure 6:
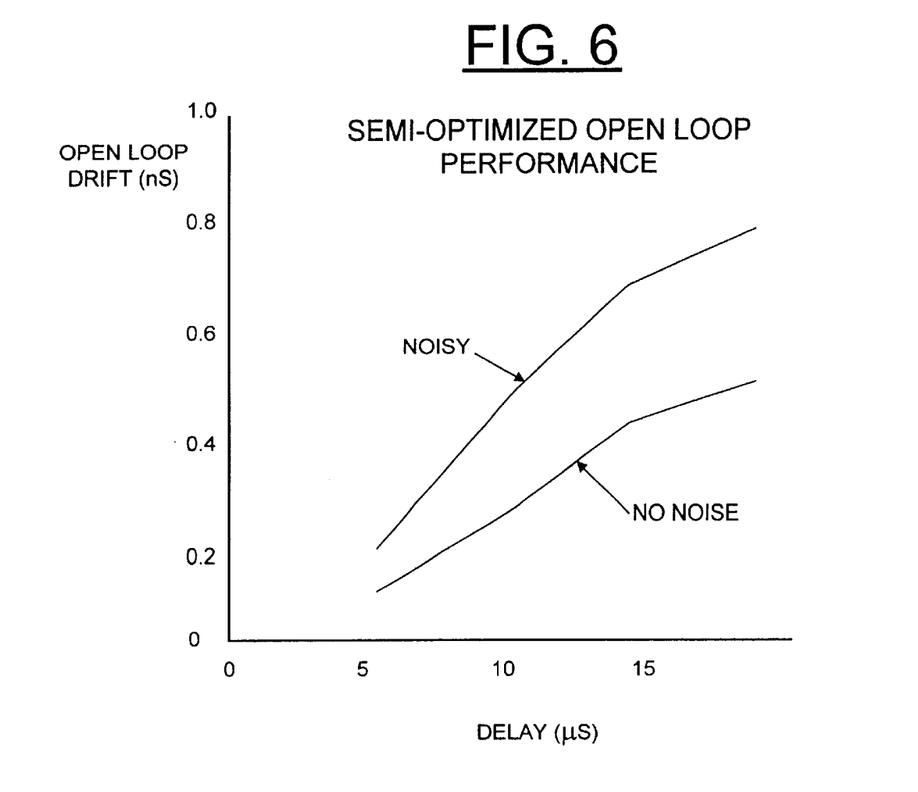
FIG. 6 is a graph illustrating open loop drift versus time with no noise and noisy operation of a conventional data channel.

FIG. 6 illustrates open loop drift versus time with no noise and noisy operation of a conventional data channel. The timing jitter or increase in timing uncertainty results as the trigger delay is extended, without the precise reference clock of the data channel 100. Important delays are on the order of tens of microseconds. The timing jitter of a conventional data channel has too much variability.

Figure 7:
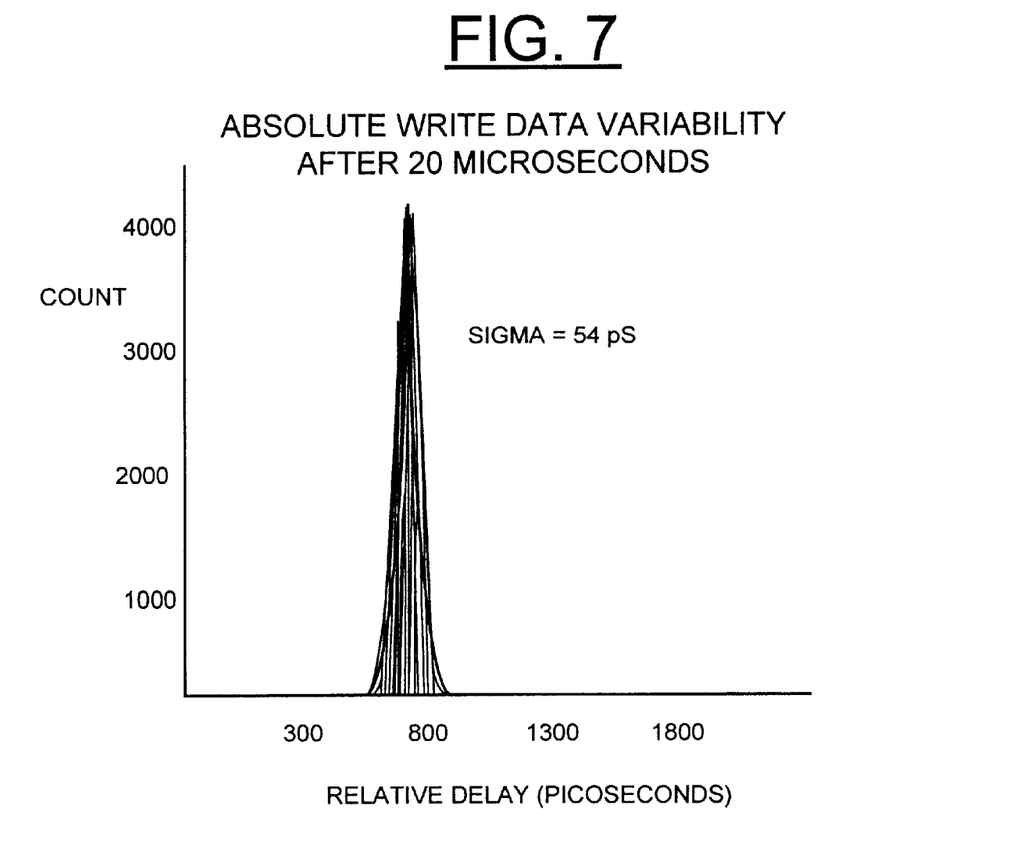
FIG. 7 is a graph illustrating absolute write data variability versus relative delay in data channel of FIG. 1 in accordance with the preferred embodiment.
Figure 8:
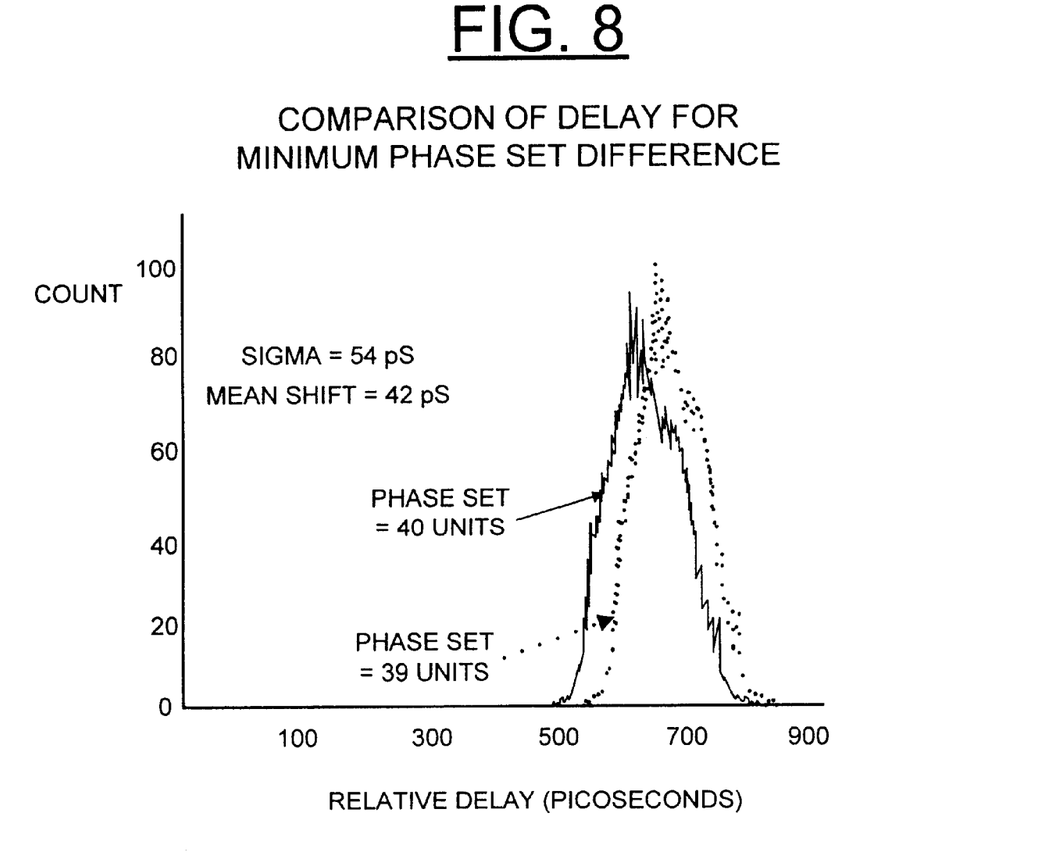
FIG. 8 is a graph illustrating two different phase settings versus relative delay with a minimum change in phase set in data channel of FIG. 1 in accordance with the preferred embodiment.
Figure 9:
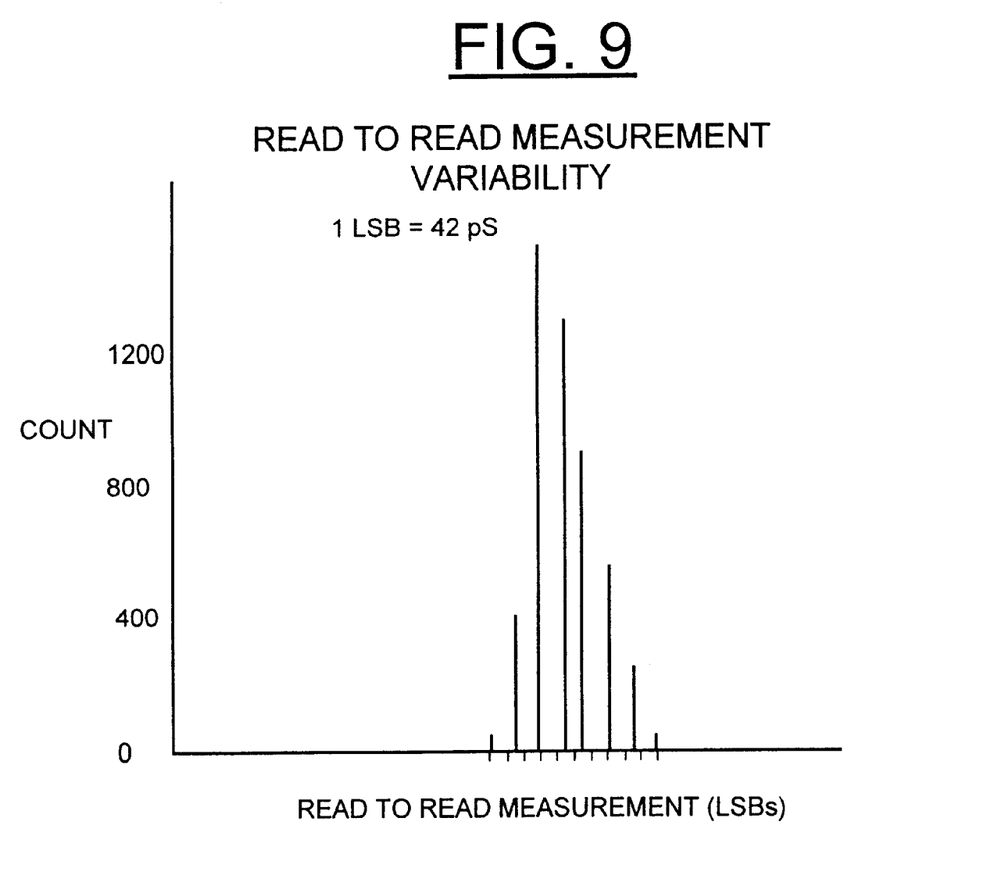
FIG. 9 is a graph illustrating read-to-read measurement variability in data channel of FIG. 1 in accordance with the preferred embodiment.

Having reference now to FIGS. 7, 8 and 9, improved phase alignment operation of the data channel 100 is illustrated. The new fundamental operation of data channel 100 is to read a data timing mark using the new analog capability, delay an integral and fractional delay, and begin a write operation. To measure the success of data channel 100, an arbitrary waveform generator was used to simulate head signals with the added benefit of very accurate and independent timing marks. A particular data pattern was arranged to appear as write data, and focused on one transition of the write data. The variability in time of this transition with respect to the known timing mark is a figure of merit.

FIG. 7 illustrating absolute write data variability versus relative delay in data channel 100 in accordance with the preferred embodiment. After a delay of 20 microseconds following a detected timing mark, the variability in a particular transition on the channel's write data lines is shown in FIG. 7. This variability includes variability due to sync mark detection, delay, and write circuits, as well as measurement errors. This example data was taken at a 2X reference clock corresponding to a 4.2 nS channel bit time, that is, for example, about 475 MHz as input as the 2X clock.

FIG. 8 illustrates two different phase settings versus relative delay with a minimum change in phase set in data channel 100 in accordance with the preferred embodiment. As shown, a first phase is set to 40 units and a second phase is set to 39 units for a 1 LSB change in the delay value. The average delays show monotonic and expected behavior with different phase settings.

FIG. 9 illustrates read-to-read measurement variability in data channel 100 in accordance with the preferred embodiment. The read-to-read measurement variability in data channel 100 shown in FIG. 9 illustrates the channel's performance in measuring the time interval between consecutive timing mark detections. To evaluate this measurement, an arbitrary waveform generator was used to simulate head signals. The read data consisted of two data timing marks space apart by 30 microseconds. After each read-to-read operation, information from the coarse measurement and fractional measurement were used to calculate the read-to-read time interval. The distribution of measured times in shown in FIG. 9. This example data was taken at a 2X reference clock corresponding to a 4.2 nS channel bit time, that is, for example, about 475 MHz as input as the 2X clock. The read-to-read variation is about 60 pS 1 sigma.

While the present invention has been described with reference to the details of the embodiments of the invention shown in the drawing, these details are not intended to limit the scope of the invention as claimed in the appended claims.

What is claimed is:

1. A method for implementing improved phase alignment in a direct access storage device (DASD) comprising the steps of:

receiving a reference clock input for providing a system clock;

locking to a synchronization field by adjusting the phase of said system clock;

detecting a timing mark and holding said adjusted phase of said system clock after detecting said timing mark;

responsive to said detected timing mark, providing a reference delay of a predefined number and fraction of system clock periods; and at an end of said reference delay, accepting data and generating write signals for a write operation.

2. A method for implementing improved phase alignment in a direct access storage device (DASD) as recited in claim 1 wherein the step responsive to said detected timing mark, of providing said reference delay includes the steps of adjusting the phase of said system clock corresponding to a predefined fractional delay.

3. A method for implementing improved phase alignment in a direct access storage device (DASD) as recited in claim 2 includes the step of using said system clock with said adjusted phase corresponding to a predefined fractional delay to run a programmable counter; said programmable counter counting said predefined number of system clock periods corresponding to said reference delay.

4. A method for implementing improved phase alignment in a direct access storage device (DASD) as recited in claim 1 includes the step of measuring a time between detected consecutive timing marks.

5. A method for implementing improved phase alignment in a direct access storage device (DASD) as recited in claim 4 wherein the step of measuring a time between detected consecutive timing marks includes the steps of counting system clock periods responsive to detecting said timing mark and continuing to count system clock periods until a next timing mark is detected.

6. A method for implementing improved phase alignment in a direct access storage device (DASD) as recited in claim 5 includes the step of storing said an identified number of system clock periods and said current adjusted phase of the system clock.

7. A method for implementing improved phase alignment in a direct access storage device (DASD) as recited in claim 1 wherein the step of locking to said synchronization field by adjusting the phase of said system clock includes the step of utilizing a phase mixer coupled to timing loop logic to vary the phase of said system clock.

8. A method for implementing improved phase alignment in a direct access storage device (DASD) as recited in claim 7 wherein the step of detecting said timing mark and holding said adjusted phase of said system clock after detecting said timing mark includes the step of using a timing mark detect logic function for detecting said timing mark and holding said adjusted phase of said system clock after detecting said timing mark.

9. Apparatus for implementing improved phase alignment in a direct access storage device (DASD) comprising the steps of:

a reference clock input for providing a system clock;

timing loop logic for adjusting the phase of said system clock; said timing loop logic for locking to a synchronization field by adjusting the phase of said system clock;

timing mark detect logic for detecting a timing mark and said timing loop logic for holding said adjusted phase of said system clock after detecting said timing mark; said timing mark detect logic, responsive to said detected timing mark, adjusting the phase of said system clock corresponding to a predefined fractional delay;

a reference delay programmable counter, responsive to said detected timing mark, receiving said system clock having said adjusted phase corresponding to said predefined fractional delay for providing a reference delay of a predefined number of system clock periods; and write logic, responsive to an end of said reference delay, for accepting data and generating write signals for a write operation.

10. Apparatus for implementing improved phase alignment in a direct access storage device (DASD) as recited in claim 9 wherein said timing mark detect logic, responsive to detecting said timing mark for starting a counter for counting system clock periods until said timing mark detect logic detects a next consecutive timing mark; and said timing mark detect logic for storing a count value between said consecutive timing marks.

11. Apparatus for implementing improved phase alignment in a direct access storage device (DASD) as recited in claim 9 wherein said reference delay programmable counter, responsive to said write logic, for providing said reference delay of said predefined number of system clock periods.

12. Apparatus for implementing improved phase alignment in a direct access storage device (DASD) as recited in claim 11 wherein said write logic responsive to an end of said reference delay, for accepting data and generating write signals for a next write operation.

* * * * *